May 28, 1929.  C. M. HENDERSON  1,714,781
MOLDING MACHINE
Filed Aug. 24, 1926   5 Sheets-Sheet 2
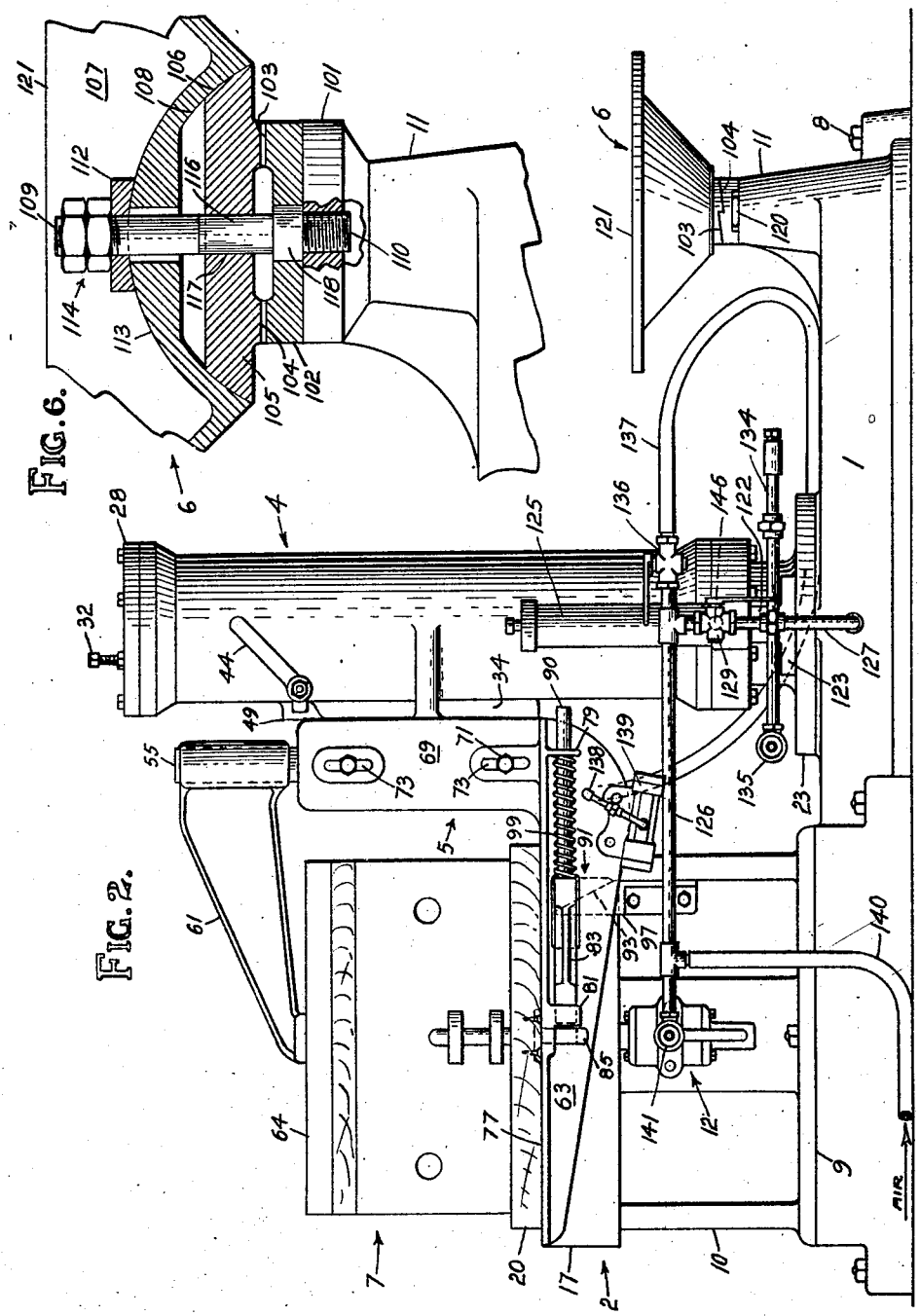
INVENTOR.
Clarence M. Henderson
BY M. C. Frank
ATTORNEY.

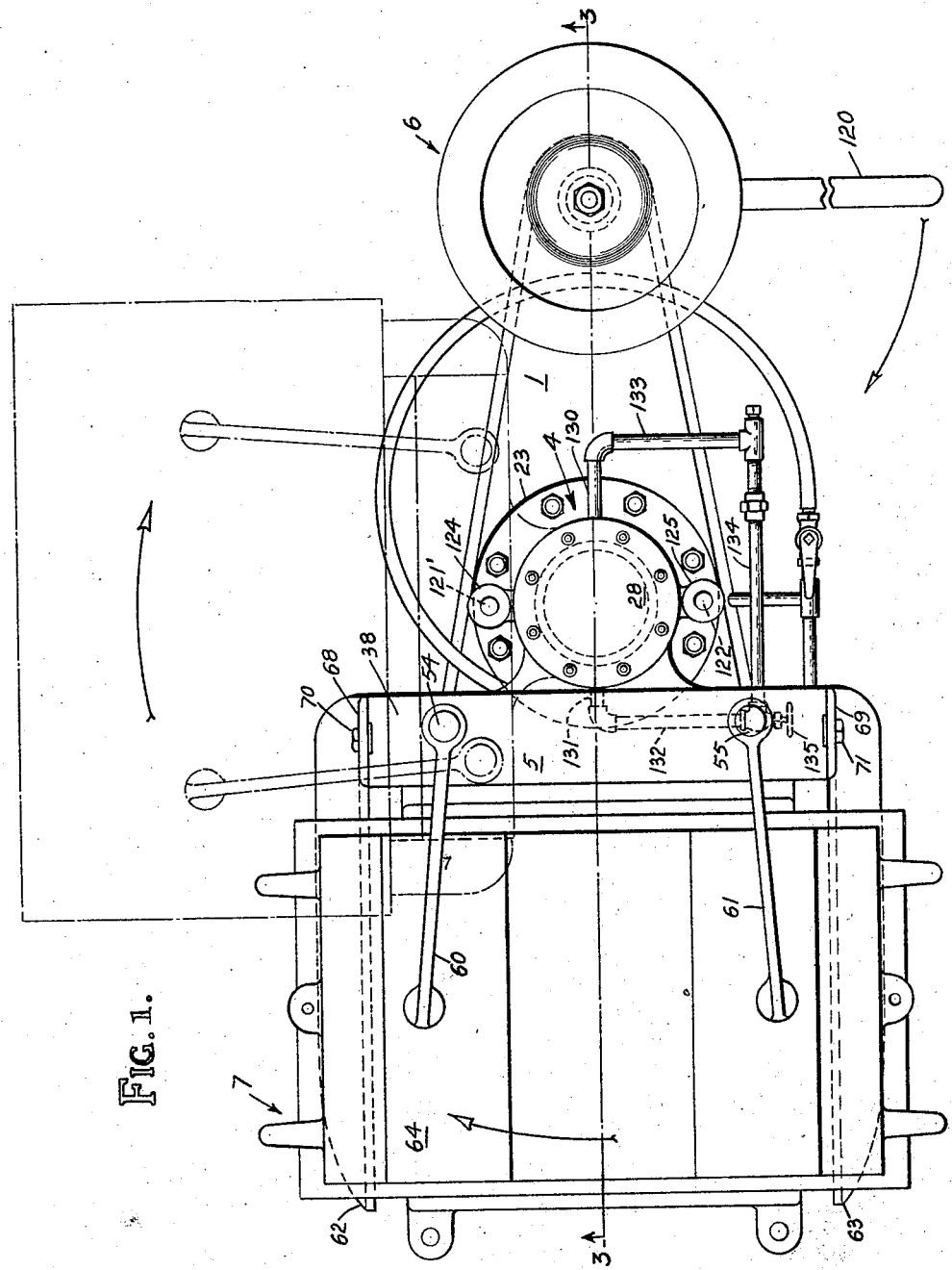

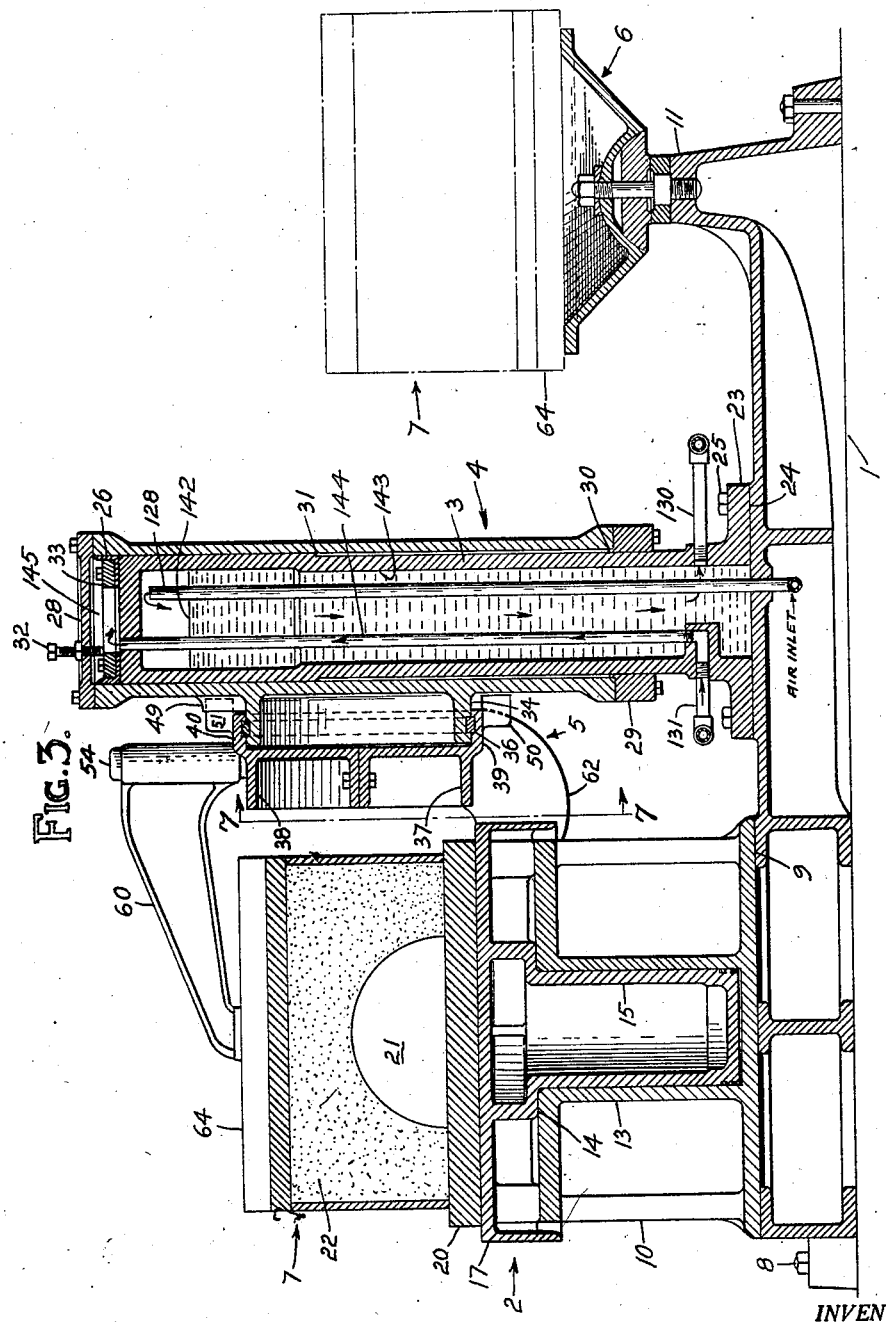

May 28, 1929.  C. M. HENDERSON  1,714,781
MOLDING MACHINE
Filed Aug. 24, 1926  5 Sheets-Sheet 4
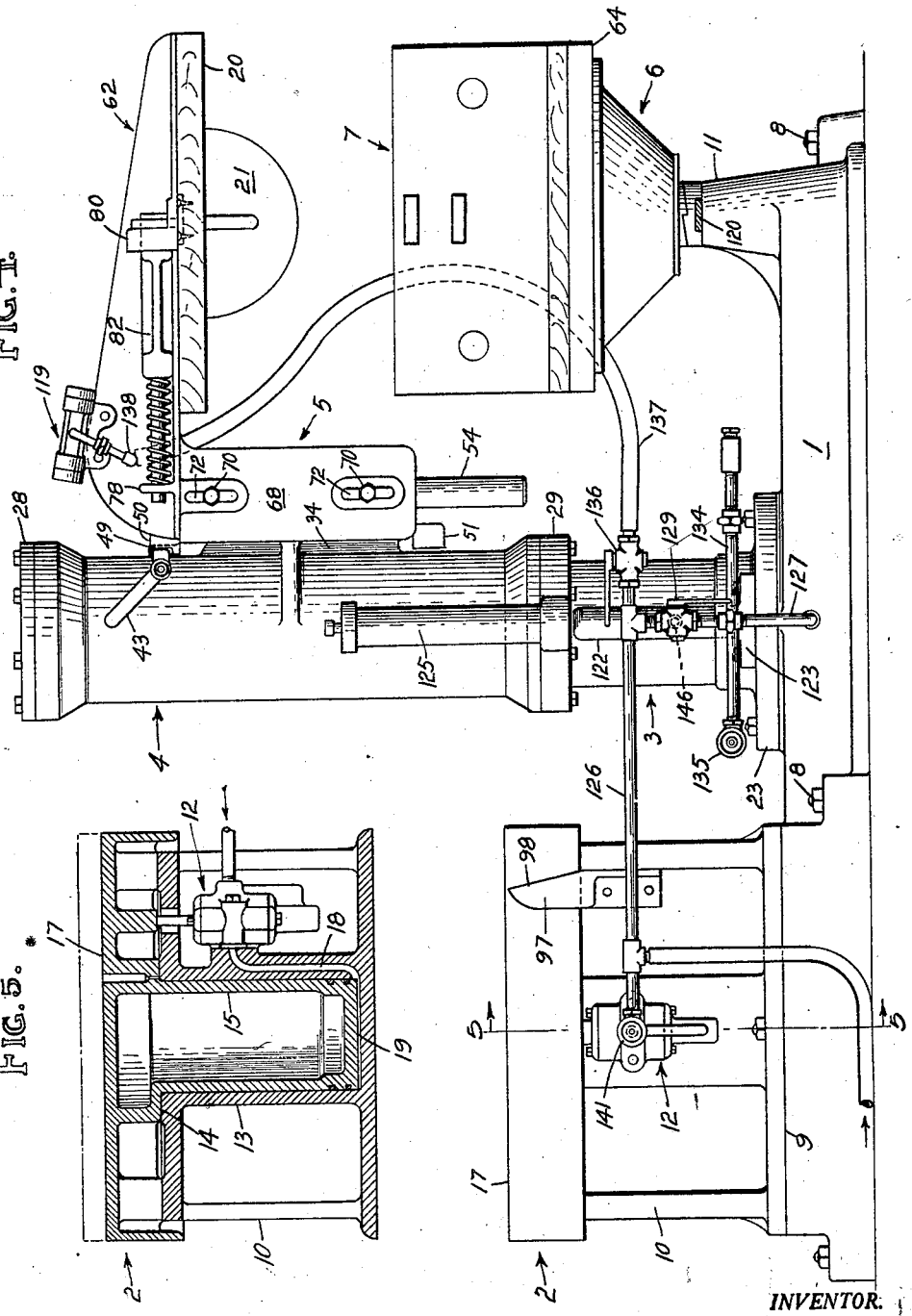
INVENTOR.
Clarence M. Henderson
BY M. C. Frank
ATTORNEY.

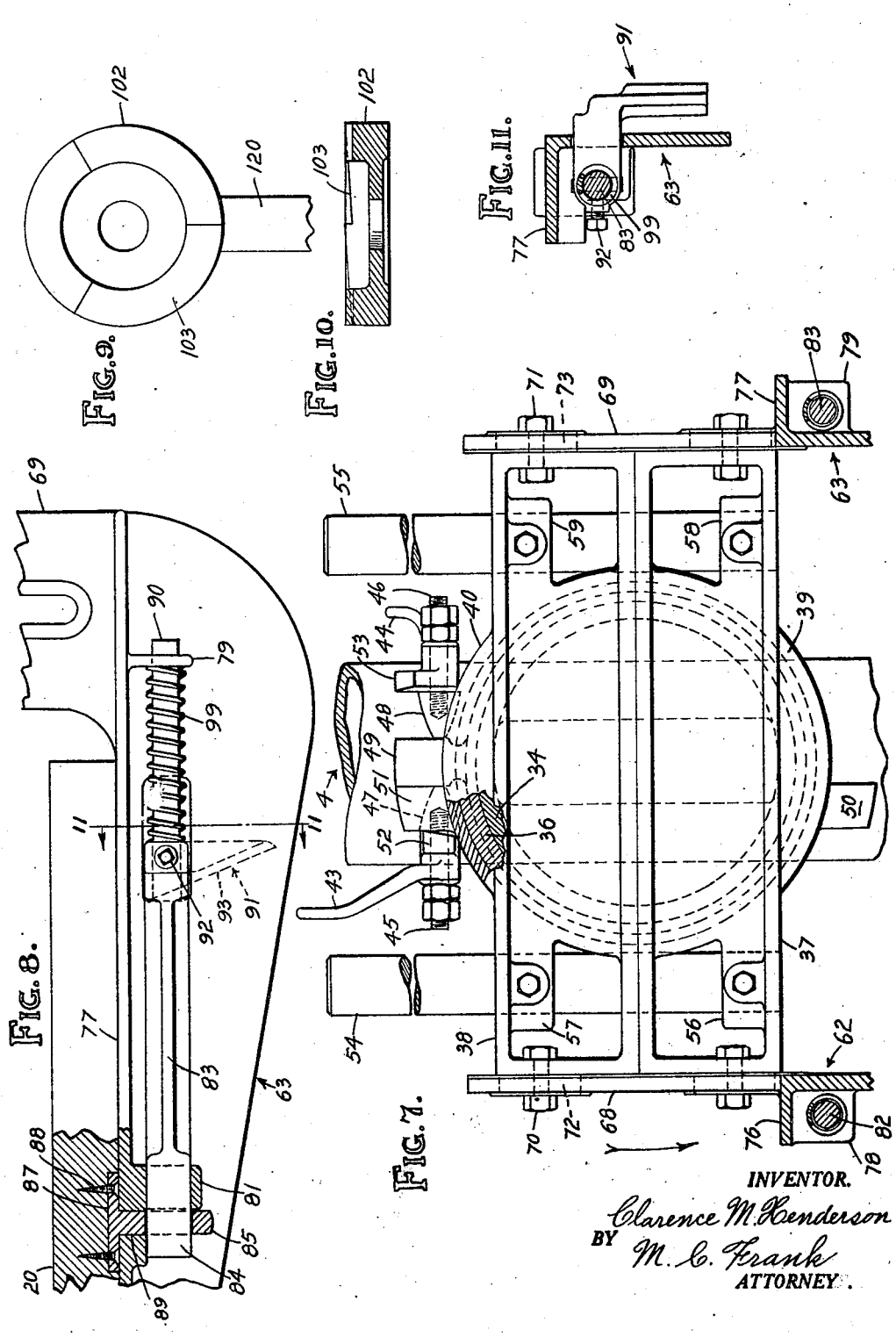

Patented May 28, 1929.

1,714,781

UNITED STATES PATENT OFFICE.

CLARENCE M. HENDERSON, OF OAKLAND, CALIFORNIA, ASSIGNOR TO H. C. MACAULAY FOUNDRY COMPANY, OF BERKELEY, CALIFORNIA, A CORPORATION OF CALIFORNIA.

MOLDING MACHINE.

Application filed August 24, 1926. Serial No. 131,168.

This invention relates generally to molding machines for foundry use and more particularly to combined machines for jarring, molding, and mold-reversing machines, commonly termed "turn-over molding machines" in the art to which they pertain.

In present machines of this character that I am aware of, it has been the common practice to construct them along certain well-defined lines and in which the mode of operation for turning over the mold is through a vertical angle about a horizontal axis. Constructions on this basis are, of necessity, extremely heavy, cumbersome in operation, expensive to construct and maintain, and are not very durable.

The primary object of the present invention, is the provision of a combined jarring, molding, mold-reversing and mold-leveling machine which is of comparatively simple construction, is durable, easy to operate and which embodies the several features in the one compact unit of comparatively light weight.

Another object is the provision of a machine of this character which may be readily actuated by compressed air approximating the low pressure of forty pounds per square inch to raise the mold bodily, and allow it to be manually swung laterally about a vertical axis to a convenient clearance position, where the mold may then be manually turned and reversed about a horizontal axis and the reversed mold finally lowered on the leveling table by the release of the controlled air pressure.

Another object is the provision for permitting the initial operation of "jolt-ramming" on the sand-filled flask by positive simple means on the combined machine requiring no attention from the operator as to whether or not the flask is locked to the lifting part of the machine, or free to be jolted on the jarring table thereof.

Another object of the invention is the provision of simple pressure means for raising the mold, and automatic spring-controlled means coactively associated therewith for locking the mold and mold-board to the supporting arms of the device.

An additional object is the provision of vibrating means coactively associated with the supporting arms of the machine in such a manner that the mold, in the reversed position and on the leveling table, may have its mold-board and attached pattern vibrated simultaneously as the said mold-board and pattern are withdrawn vertically from the stationary mold on said table.

Additional to the foregoing objects is the provision of a leveling table for the placement of the reversed mold thereon, which will automatically adjust itself to any inequalities on the bottom-board of the mold, and that may be locked in the level position assumed.

In addition to the above broader features of the invention, there are certain details of design, whereby compactness, durability of structure, and positiveness and ease of operation are attained, and which details are shown on the accompanying five sheets of drawings illustrating the present embodiment of my invention, and what I claim as new, is particularly pointed out in the appended claims following this specification.

Referring to the drawings:

Figure 1 is a plan of the machine showing the mold in place upon the jarring table, the dot-and-dash lines illustrating the position of the mold when swung angularly in a horizontal plane and in the region of which position it may be reversed prior to its deposit upon the leveling table shown to the extreme right of the figure;

Fig. 2 is a side elevation of the machine showing the mold positioned upon the jarring table and upon the supporting arms of the machine, and is in readiness for the raising of the mold above the jarring table;

Fig. 3 is a central vertical longitudinal section taken through the machine as illustrated in Figs. 1 and 2, and indicated by the line 3—3 of Fig. 1;

Fig. 4 is a side elevation of the machine showing the cylinder raised and carrying the reversed supporting arms and mold-board, the position being that assumed by the mechanism subsequent to the deposit of the mold and release of the pattern therefrom, the supporting arms, mold-board and attached pattern now being free to be reversed and returned to the normal position for the molding repetition as shown in Figs. 1 and 2;

Fig. 5 is a sectional detail of the jarring table showing the piston air port and control valve for actuating the piston reciprocatively, the section being indicated by the line 5—5 of Fig. 4;

Fig. 6 is a fragmentary and enlarged sectional detail of the leveling table and pedestal therefor, and the means for locking said table against movement;

Fig. 7 is an enlarged and partially sectioned detailed elevation of a portion of the turn-over or reversing mechanism and locking means therefor, the section being indicated by the line 7—7 of Fig. 3;

Fig. 8 is an enlarged fragmentary side elevation, partly in section, of one of the supporting arms and mold locking mechanism in engagement with the mold-board;

Fig. 9 is a detail view of the locking means and lever for the leveling table, and Fig. 10 is a cross-section therethrough; and Fig. 11 is a sectional detail taken through one of the supporting arms to primarily show one of the cam elements for the actuation of the automatic mold-locking means to the jarring table, the section being indicated by the line 11—11 of Fig. 8.

Referring in detail to the drawings, broadly, my invention consists of a main supporting base 1, Fig. 4, a jarring table 2, piston 3, cylinder 4, mold-supporting and carrying frame 5, leveling table 6, and flask or mold 7.

The supporting base 1 comprises a casting adapted to be bolted to any suitable foundation by the bolts 8, and has a finished face 9 at one end and upon which is mounted the jarring-table frame 10. A pedestal 11 is formed at the opposite end of the base and to which is secured the leveling table 6 as hereinafter described.

The jarring table 2 shown in the drawings and its control valve 12, are adaptations of my jarring table and valve patented December 31, 1912, Patent No. 1,048,692, the only difference being slight structural changes in design. The frame 10 of the jarring table in the present construction, Fig. 5, is provided with a centrally positioned cylinder 13 formed integral with the frame as is also the anvil 14; the piston 15 is integral with the table plate 17 and is adapted to impart a jolting movement through the reciprocative action of the piston 15 caused by the valve 12 admitting air under pressure to the port 18 which communicates with the lower end of the cylinder bore 19.

As shown in Figs. 2 and 3, the mold or flask 7 is first placed upon the jarring table with the mold-board 20 properly positioned thereunder and the pattern 21 being properly secured to the mold-board. In this position the sand 22 is jar-rammed as is the ordinary practice and the top of the flask is finally struck off and the bottom-board 64 placed.

The piston 3 of the machine is a hollow shell, Fig. 3, having a flanged bottom end 23 adapted for bolting to the finished surface 24 of the base 1 intermediate the jarring table 2 and leveling table 6, and is secured in place to said base by the bolts 25. The piston is closed at its upper end and has secured to this end a leather cup 26 adapted to form a seal within the bore of the cylinder 4, for the fluid forced in and out of the cylinder as hereinafter set forth. The cylinder is capped at its upper end by a plate 28, and at its lower end is an annular ring 29 fitted about a reduced diameter of the piston. The ring has a lip 30 extending slightly into the lower end of the bore of the cylinder to form a stop and is adapted to engage a shoulder 31 formed at the upper end of the said reduced diameter of the piston, to prevent the cylinder from rising above this point when pressure is introduced within the cylinder. A set screw 32 is tapped through the plate 28 and acts as a stop against the cup-leather holding ring 33, and it is adapted to adjust the downward limit of movement of the cylinder 4 upon its piston 3. On the side of the cylinder 4 is a projecting annular supporting ring 34 positioned intermediate its ends and is provided with an annular recess in its periphery for the reception of a sectional ring 36, Fig. 3.

The mold-supporting frame 5 is revolubly borne by a halved rectangular frame formed by the two sections 37 and 38, Fig. 7, having annular bearing sections 39 and 40 integral therewith that form an annular housing. In each half of the housing is formed an internal recess adapted to fit over and embrace the outer portion of the said section ring 36. This construction holds the mold-supporting frame in position upon the supporting ring 34 but revoluble at will relative to the cylinder 4, as shown in Figs. 3 and 7. The means for locking the supporting frame 5 to the cylinder 4 against a turning movement with respect thereto, consists of a pair of oppositely disposed levers 43 and 44, Fig. 7, mounted upon studs 45 and 46 that are tapped into a pair of lugs 47 and 48 cast on the cylinder 4. On the latter is also cast a stop 49 intermediate the lugs and which is adapted to be engaged alternately on its opposite sides by other lugs 50 and 51 that are formed substantially diametrically opposite each other upon the sections 39 and 40 of the annular housing of the frame 5. As shown in Fig. 7, the member 52 of the lever 43 formed integral therewith and angularly positioned thereto is in engagement with the lug 51, which in turn is caused to bear against a side of the stop 49, thus rigidly locking the supporting frame in normal position; but when the said frame is reversed or turned about the supporting ring 34, the lug 50 is brought into contact engagement with the opposite face of the stop 49 and the similar member 53 of the lever 44 is swung to bearingly engage the lug 50 to hold the supporting frame in said reversed position.

To the supporting frame 5 is mounted a pair of equally spaced clamp-supporting shafts 54 and 55, Fig. 7, in sets of vertically disposed lugs 56, 57, and 58, 59, integrally formed in the frame sections 37 and 38 and held in place by set screws. The said shafts extend from the upper surface of the section 38 and are adapted to slidingly receive a pair of sleeved clamp members 60 and 61, Fig. 1. The outer free ends of the said members are adapted to engage the bottom-board 64 of the mold, and the sleeves of the clamp members, when the mold is raised, impinge against the shafts 54 and 55 and bind the mold 7 rigidly in place upon the supporting arms 62 and 63 of the supporting frame 5 as shown in Figs. 1, 2 and 3.

The supporting frame 5, Fig. 7, is constituted of the sections 37 and 38 of rectangular configuration having finished side faces and against which are adjustably secured a pair of L-shaped side members 68 and 69 integrally carrying the aforementioned supporting arms 62 and 63. The L-shaped members are secured to the said sections by tap bolts 70 and 71 through slots 72 and 73 that provide for the vertical adjustment of the supporting frame to centrally position the frame with respect to the depth of the flask on the jarring table. The horizontally disposed mold-supporting arms 62 and 63 of the vertical members 68 and 69 extend from the supporting frame on opposite sides of the table plate 17 and are normally flush with the top of said plate as shown in Figs. 2 and 3; said arms being cast of angle-iron form and having horizontally disposed flanges 76 and 77, Fig. 7, upon which the mold-board 20 rests as shown in Figs. 2 and 8.

The supporting arms 62 and 63 are provided adjacent their inner ends, Figs. 7, 8, 2 and 4, with lugs 78, 79, and centrally disposed lugs 80 and 81, bearing locking bolts 82 and 83, of which the latter one, Fig. 8, will be described, as both are identical in construction and operation. Said bolt 83 is of rectangular shape at its end 84 and extends through a rectangular opening formed in the lug 81, and is adapted to slide therein when released to lock the mold-board 20 to the frame through engagement with the T-shaped member 85 having a complementary rectangular opening adapted to register with the adjacent opening and bolt end 84. The said member 85 has its head 87 mortised into the mold-board and is held in place by screws 88, and the member 85 extends through a slot 89 formed in the flange 77 of the arm 63.

The opposite end of the bolt 83 is in the form of a rod 90, and is slidable through an opening in the lug 79. The rod carries a cam 91 secured thereto by a set screw 92, Figs. 8 and 11. The cam is of L-shaped construction and has its working face 93 projecting angularly downwards, and is adapted to normally engage a cam 97, Fig. 4, having a cam surface 98, one each being secured to opposite sides of the jarring table frame 10. When the mold 7 is resting upon the jarring table, as in Figs. 2 and 3, and before the cylinder 4 is actuated to raise the mold, the spring 99 surrounding the rod 90 is under compression by reason of the cams 91 and 97 being in engagement, and which engagement normally withdraws the bolt 83 from the T-shaped member 85, as is clearly shown in Fig. 2. When pressure is introduced to the cylinder 4 and the latter rises and carries the supporting frame 5 vertically with it, the cam 91 disengages from the cam 97 and moves forwardly with the bolt 83, the end 84 of which engages the mold-board member 85 and locks the mold-board rigidly in position with the said frame 5.

The leveling table 6, Figs. 2, 3 and 6, is mounted upon the pedestal 11 formed at the opposite end of the base from that of the jarring table frame 10, and is provided at its upper end with a head 101 and upon which is mounted an annular member 102 having its upper face provided with radially-disposed inclined surfaces 103 adapted to mesh with complementary surfaces 104 formed upon the bottom face of another annular member 105. The latter member is provided with an upper rounded surface 106 and upon which is mounted an inverted frusto-conical member 107 having a correspondingly rounded socket 108 adapted for ball-and-socket movement thereon. The said frusto-conical member is secured to the pedestal by means of a bolt 109 having its lower extremity 110 tapped into the head 101 of the pedestal, said bolt being provided at its upper end with a dished washer 112 adapted to rest upon the rounded top surface 113 and held in place by a pair of jam nuts 114 mounted upon the upper end of the bolt 109.

The bolt 109 is squared as indicated at 116 and which squared portion extends through a corresponding squared opening 117 formed centrally of the annular member 105, the lower enlarged cylindrical section 118 of said bolt forming a shoulder adapted to bind upon the head 101 of the pedestal and extending through a corresponding opening formed in the member 102, so that the member 102 may turn relative to the bolt section 118, but the member 105 will be held stationary with the bolt by virtue of the squared section 116 thereof extending through the squared opening 117 of said member.

A hand lever 120, Figs. 1 and 9 is rigidly secured to the member 102, and when said lever is turned to the position shown in Fig. 1, the member 102 is rotated therewith thus causing its inclined surfaces 103 to turn and bear against the stationary inclined surfaces 104 of the member 105, thereby raising said member 105 relative to the member 102 and drawing the washer 112 tightly against the surface 113, and thus locking the leveling table 6 rigidly to the pedestal in whatever position the upper face 121 of the table has assumed, that is, whether it be of slight angular inclination or perfectly level relative to the base of the combined molding machine. The level assumed is that caused by the mold 7 adjusting itself to the equilibrium position when the mold is deposited upon the table irrespective of the unevenness of the bottom-board 64 of the mold.

A pair of guide rods 121' and 122, Figs. 4 and 1, are disposed at opposite sides of the piston 3, and have flanged bases 123 which rest upon and are bolted to the upper face of the flange 23 of said piston. The rods extend upwardly a short distance from the base and are adapted to be engaged by rigidly mounted guide sleeves 124 and 125 cast or otherwise secured to opposite sides of the cylinder 4, and are adapted to guide the cylinder 4 and supporting frame 5 carried thereby in their vertical movement and prevent lateral turning thereof until the cylinder and its sleeves 124 and 125 have been raised sufficiently to clear the rods 121' and 122 and in which position the cylinder unit is free to be manually swung horizontally about the piston 3.

A main air line 126, Figs. 2 and 4, is in connection with the jarring table air valve 12, and with the interior of the piston, Fig. 3, by a branch line 127 which terminates in a stand pipe 128 extending to near the upper end of said piston, as shown to advantage in Figure 3. The said line 127 is provided with a three-way valve 129 for a purpose hereinafter described.

Nipples 130 and 131, Fig. 3, are tapped into the opposite sides of the piston 3 near its base, and are connected in circuit, Fig. 1, by nipples 132, 133 and 134 and have an angle valve 135 interposed between the nipples 132 and 134 for the purpose of introducing fluid under pressure to the cylinder above the piston and holding said pressure therein when desired by the closing of said valve 135, and conversely, the opening of said valve relieves the pressure and permits the fluid to retrace itself to the interior of the piston again. The main line 126 is also provided with a valve 136, Figs. 2 and 4, having a flexible connection 137 leading therefrom to a connection 138, which is in turn connected to vibrators 139 and 119, well known to the art, and which vibrators are mounted upon the supporting arms 62 and 63 to vibrate the supporting frame to release the pattern from the mold as hereinafter described. The flexible connection 140, Fig. 2, which communicates with the line 126 may be connected to any source of compressed air supply, not shown, the valve 141 of the air valve 12 being utilized to control the introduction of air from the main line to said valve 12 to control the operation of the jarring table.

The operation of the machine is as follows: Assuming that the sand-filled mold-flask and inclosed pattern as having been jarrammed by admitting air under pressure to the valve 12 by the manipulation of the valve 141 and the pressure as having been shut off by the closing of said valve 141, the mold of course being free for vertical reciprocative movement by reason of its T-shaped members 85 being mounted for vertical movement in the slots 89 of the supporting-frame arms as shown in Fig. 2, except that the clamps 60 and 61 are not placed upon their shafts 54 and 55 until after the jarring operation has been completed; then after the jarring operation, the said clamping arms 60 and 61 are position and the mold with the locking bolts 82 and 83 withdrawn as shown in said Fig. 2 is ready for the next operation, which is the raising of the mold from the jarring table. This is accomplished by the manipulation of the three-way valve 129, which admits compressed air to the pipe 127 and stand pipe 128, Figs. 2 and 3, and thence to the space above the oil column 142 which is maintained within the piston chamber 143. The admitted air under pressure forces the oil to pass through the nipple 130, pipes 133 and 134, Fig. 1, through the opened valve 135 and nipples 131 and 132 to the opposite side of the piston 3 and thence into the vertical pipe 144 communicating with the chamber 145 of the cylinder 4, whereupon the cylinder 4 carrying the supporting frame 5, and locked mold which is locked by the release of the bolts 82 and 83, is raised vertically until the cylinder guide sleeves 124 and 125 have cleared the guides 121' and 122, as shown in Fig. 4, and at which height the valve 129 is shut off to maintain the pressure within the cylinder, so that the said cylinder and the supporting frame carried thereby may be swung manually in a horizontal plane about the stationary piston to the clearance position indicated by the dot-and-dash lines as shown in Fig. 1. In this position the locking lever 43, Fig. 7, may be released and which frees the lug 51 of the supporting member 40 so that the entire supporting frame 5 and clamped mold thereto may be rotated upon the supporting ring 34 to completely reverse said frame, as shown in Fig. 4, the opposite lug 50 then being in contact with the opposite face of the stop 49 and in which position it is locked by the opposite locking lever 44 and integral angular member 53 thereof engaging the said lug 50.

The inverted frame and mold are now swung around in a horizontal plane until the mold is directly over the leveling table-top 121 and at which point the valve 129 is released to exhaust the air pressure from the cylinder by way of the valve exhaust outlet 146. The valve 135 being opened and the pressure thus released from the oil in the cylinder above the piston, causes the said oil to again retrace through the pipe 144, nipples 131 and 132, pipe 134 and nipples 130 and 133 and finally into the piston chamber 143, thereby causing the consequent lowering of the cylinder and mold until the latter has been deposited in the reversed position upon the leveling table 6. The clamps 60 and 61 are then tapped with any instrument and released from their impingement hold on the inverted shafts 54 and 55.

Compressed air is next introduced by the valve 136 to the connection 137 and vibrating cylinders 139 and 119 and cause a high frequency vibratory movement to be transmitted to the supporting frame 5 and coupled moldboard 20 for the purpose of easing the pattern in the mold for vertical withdrawal therefrom. The valve 129 is then manipulated to introduce air pressure as before and the cylinder and frame carrying the locked pattern and mold-board are again raised to the position shown in Fig. 4, swung to the position shown in Fig. 1, reversed as before and returned to the jarring table for the next operation.

Other parts shown in the drawings but not specifically referred to, are ordinary structural parts and need no description.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired, as fall within the scope of the appended claims.

Having thus described my invention, I claim as new and desire to secure by Letters Patent of the United States, the following:

1. In a combined jarring, molding, and mold-reversing machine, the combination with a jarring table, of a hydraulically-operated mold-supporting mechanism cooperatively associated therewith, clamps for the mold, said mechanism comprising a stationary vertically-positioned piston and a vertically-movable free floating cylinder mounted thereon, means for introducing fluid pressure to said cylinder to raise and simultaneously clamp the entire mold, manually-operated means for swinging the clamped mold in a horizontal plane and for manually turning said supporting mechanism to reverse the mold, pressure operated means for depositing the reversed mold, and vibratory means for releasing the pattern from said mold.

2. In a combined jarring, molding, and mold-reversing machine, the combination with a jarring table, of a hydraulically-operated mold-supporting mechanism cooperatively associated therewith, said mechanism comprising a stationary, vertically-positioned piston and a vertically-movable cylinder, a mold-bearing frame revolubly carried by said cylinder, means for locking said mold-bearing frame against rotation, and means for introducing fluid pressure to said cylinder to elevate the cylinder and permit of the horizontal swinging of the mold about the cylinder.

3. In a molding machine of the class described, the combination with a jarring table, of a hydraulically-operated mold-supporting mechanism cooperatively associated therewith, said mechanism comprising a stationary piston and a cylinder adapted for vertical and horizontal swinging movement thereon, a mold-bearing frame revolubly carried by said cylinder, locking means for clamping the mold to said frame, means for rotating the frame in a vertical plane, means for locking said frame rigidly with the cylinder, and means for introducing fluid pressure to said cylinder to raise it relative to the piston and for permitting the mold to be swung about the cylinder in a horizontal plane.

4. In a molding machine of the class described, a hydraulically-operated mold-supporting mechanism, comprising, a mounted stationary piston, a cylinder adapted for vertical and horizontal rotative movement thereon, a revoluble mold-bearing frame carried by said cylinder, said cylinder and frame being revoluble in planes at right angles to each other, locking means for clamping the mold to the frame, locking means for normally preventing rotation of said frame relative to the cylinder, and means for introducing fluid pressure to said cylinder to accomplish the vertical movement thereof.

5. In a molding machine of the class described, a hydraulically-operated mold-supporting and mold-reversing mechanism comprising, a mounted stationary piston, a cylinder adapted for vertical and rotative movement thereon, a projecting supporting ring carried by said cylinder, a mold-supporting frame carried by said ring and having an annular housing adapted for revoluble movement upon said supporting ring for the reversal of the mold, mold-locking means carried by said supporting frame and locking means carried by said cylinder and adapted to normally engage said frame to prevent rotation thereof relative to the cylinder, and controlling means adapted to admit a fluid under pressure to said cylinder to elevate the same relative to the stationary piston whereby the cylinder may be manually rotated about the piston.

6. In a molding machine of the class described, a hydraulically-operated mold-supporting and mold-reversing mechanism comprising, a vertically-positioned stationary piston, a cylinder adapted for reciprocative movement thereon, a projecting supporting ring carried by said cylinder on its side, a mold-supporting frame having an annular housing and outwardly projecting arms, said housing being adapted to embrace said supporting ring for rotation thereon, clamps carried by said frame for clamping the mold to the said arms, locking means carried by the cylinder for locking the frame thereto after the mold is turned over, and fluid-pressure operated means for elevating said cylinder and mold-frame relative to said piston for their rotation about the piston.

7. In a molding machine of the class described, a hydraulically-operated mold supporting and reversing mechanism comprising, an upright rigidly mounted piston, a cylder borne by said piston and adapted for reciprocal movement thereon and for horizontal swinging movement relative thereto, a mold-supporting frame revolubly borne by said cylinder, locking means carried by said frame to lock the mold thereto, means for normally locking said frame against rotation with respect to the cylinder, and fluid-pressure means for elevating said cylinder relative to the piston to permit horizontal rotative movement thereabout and to permit vertical rotative movement of the frame about the cylinder.

8. In a molding machine, a rigidly mounted upright piston, a cylinder supported thereby and adapted for reciprocative movement thereon and for horizontal rotative movement thereabout, a mold-supporting frame carried by said cylinder and adapted for revoluble movement thereon in a vertical plane, clamping means for holding the mold to the frame, means for normally locking said frame in rigid relation to said cylinder, means for introducing fluid pressure to said cylinder to cause the elevation thereof relative to the piston to permit the said rotative movements to be accomplished, and means limiting the reciprocative movement of the cylinder.

9. In a molding machine, a rigidly mounted upright piston, a cylinder embracing said piston and adapted for slidable support thereon and being further adapted for horizontal movement thereabout, a mold-supporting frame carried on the side of said cylinder and adapted for revoluble movement thereon in a vertical plane; said frame having horizontally extending arms and mold-locking means carried thereby in normally retracted position; and fluid pressure means in connection with the machine for introducing power to said cylinder to simultaneously elevate it and the said elements and thereby trip said normally retracted locking means to engage and lift the mold.

10. In a turn-over molding machine, a leveling table therefor adapted to receive a reversed mold, said table consisting of a base support, a ball member mounted upon said support, a frusto-conical table member provided with a socket to receive said ball member, a bolt holding said members in adjustable relation, said ball member being normally revoluble relative to its support, and cam-actuated locking means associated with said ball member to lock said ball member and frusto-conical member at any angle of inclination assumed by said frusto-conical table member upon the deposition of the reversed mold thereupon.

11. In a molding machine of the character described, the combination with a jarring table of a mold-supporting mechanism comprising, a vertically-movable member provided with a support on its side, a frame mounted on said support of greater width than the jarring table, arms secured one on each side of said frame having horizontally disposed extensions substantially embracing the jarring table and normally flush therewith, and said arms adapted for vertical adjustment on said frame relative to the support to accommodate flasks of different depths placed upon the jarring table.

12. In a molding machine, an elongated base, a jarring table mounted on one end thereof and a leveling table mounted on the other end, an upright stationary piston mounted on the base midway the said tables and in alignment therewith, a cylinder reciprocatively and rotatively mounted on the piston, the latter provided with an upstanding guide pin to one side thereof and the cylinder provided with a complementary guide sleeve to engage said pin, a mold-supporting mechanism mounted on the side of the cylinder and adapted to be turned in a plane parallel to the axis of the cylinder, the said machine provided with means to jar-ram the mold, to raise the cylinder and mold in a vertical plane constrained by the guide pin, to permit the turning of the cylinder in a horizontal plane about the axis of the piston to an angular position whereby the mold will be out of the aforesaid alignment and may be turned in a vertical plane to reverse it, to permit the further turning of the cylinder about the piston so that the cylinder may be lowered in a vertical plane constrained by the guide pin to deposit the mold on the leveling table.

13. In a molding machine of the class described, an hydraulically operated mold supporting means comprising, a stationary hollow piston providing a reservoir for an operating liquid, a cylinder mounted on the piston for longitudinal and horiozntal rotative movement with respect to the piston axis, means providing a passage connecting said reservoir with the cylinder cavity, manually operable valve means in said passage, and pneumatic means for varying the pressure on the liquid in said reservoir.

14. In a combined jarring, molding, and mold reversing machine, the combination with a jarring table, of a fluid-pressure operated mold-supporting mechanism cooperatively associated therewith, clamps for the mold, said mechanism comprising a stationary vertically positioned piston and a vertically-movable free floating cylinder engaged thereabout for rotation about its axis, and means for introducing fluid pressure to said cylinder to raise and simultaneously clamp the entire mold.

In testimony whereof, I affix my signature.

CLARENCE M. HENDERSON.